May 26, 1942.  M. J. LANDGRAF  2,284,155
FOOD MIXER
Filed April 27, 1939  3 Sheets-Sheet 1
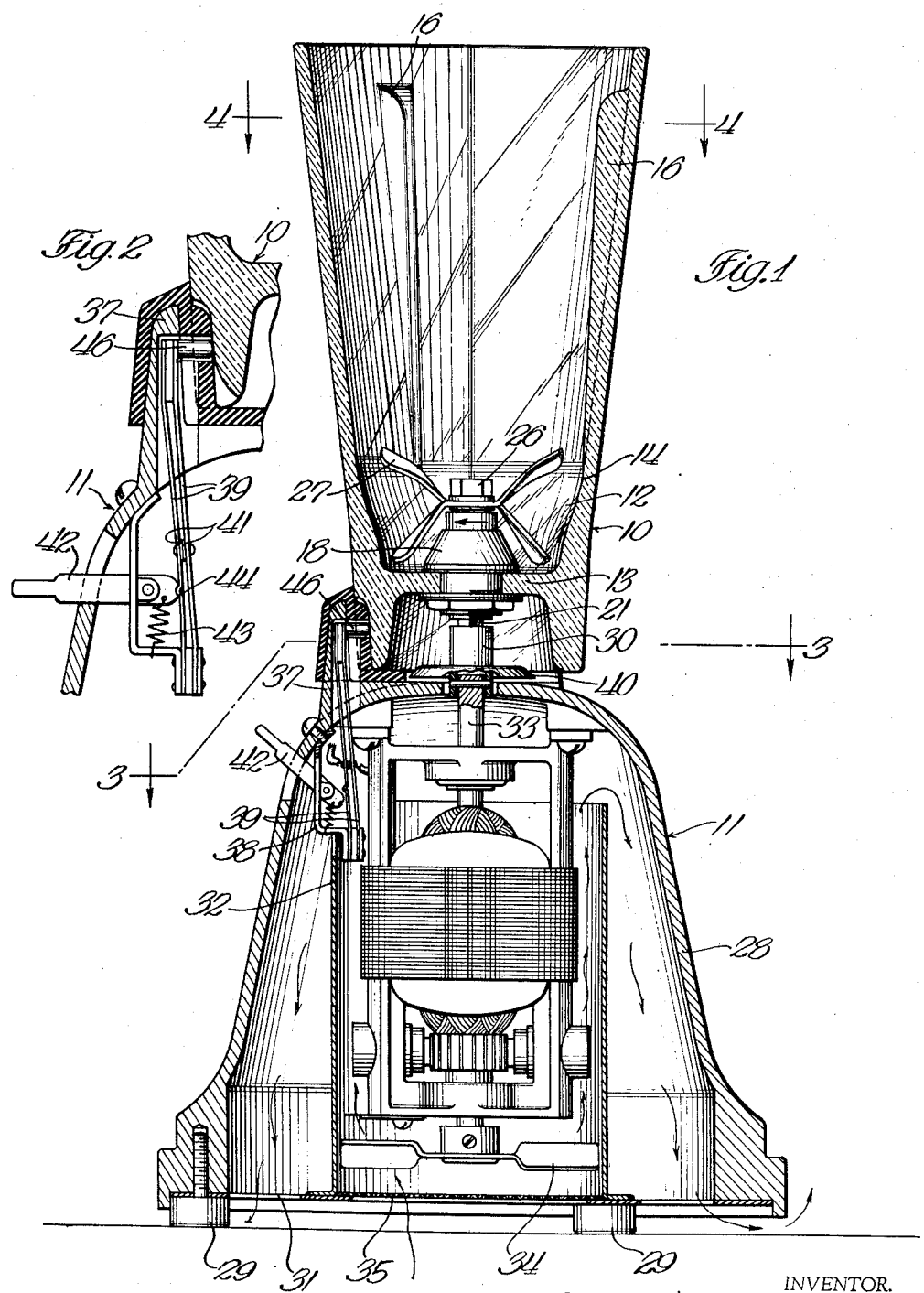
INVENTOR.
Myron J. Landgraf
BY McLaughlin & Wallenstein
ATTORNEYS May 26, 1942.   M. J. LANDGRAF   2,284,155
FOOD MIXER
Filed April 27, 1939   3 Sheets-Sheet 2
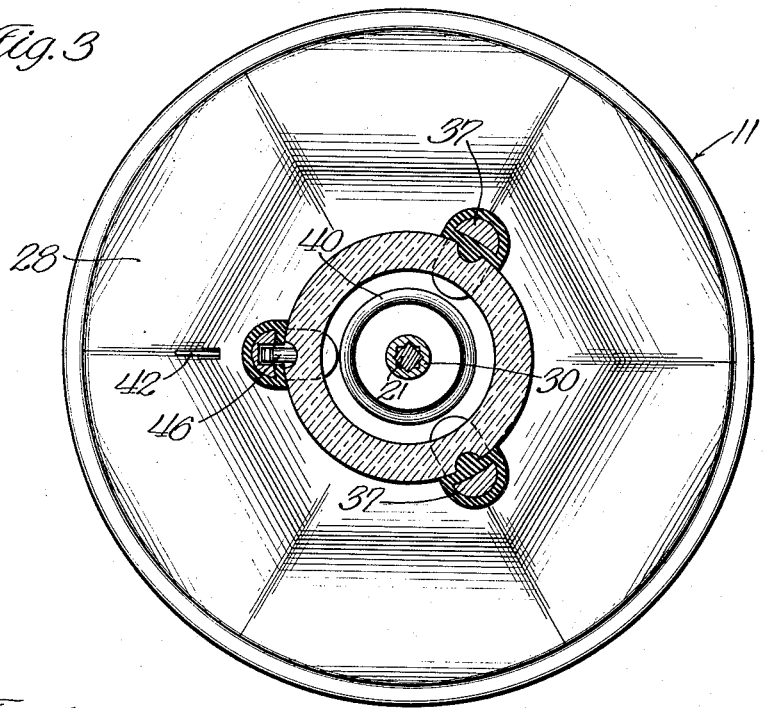
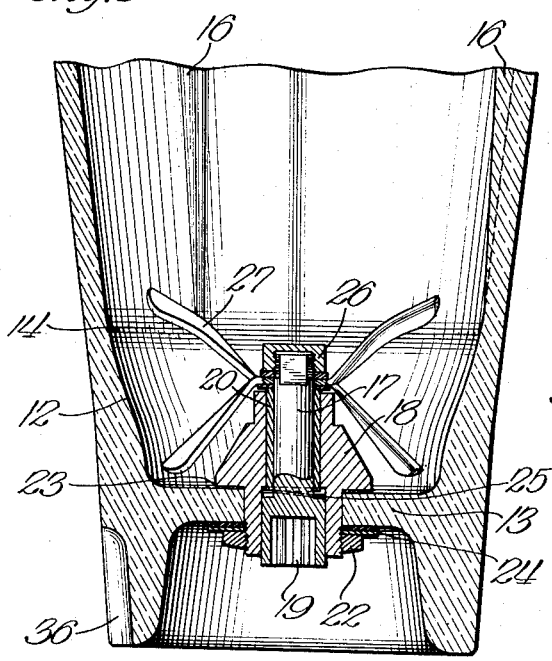
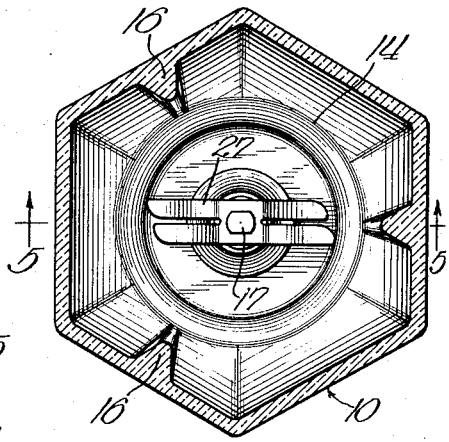
INVENTOR.
Myron J. Landgraf
BY McLaughlin & Wallenstein
ATTORNEYS May 26, 1942. M. J. LANDGRAF 2,284,155
FOOD MIXER
Filed April 27, 1939 3 Sheets-Sheet 3

INVENTOR.
Myron J. Landgraf
BY McLaughlin & Wallenstein
ATTORNEYS

Patented May 26, 1942

2,284,155

UNITED STATES PATENT OFFICE 2,284,155

FOOD MIXER

Myron J. Landgraf, Chicago, Ill., assignor to Henry J. Goldblatt, Chicago, Ill.

Application April 27, 1939, Serial No. 270,320

11 Claims. (Cl. 259—108)

My invention relates in general to mixing devices. It relates more in particular to a mixing device of a type wherein fresh vegetables, fruits, and the like, may be reduced substantially to pulp form and mixed with aqueous material. The process of so treating vegetables, fruits, and the like, at times is referred to as "hydration" and a device for producing this result may be termed a "hydrator."

The principal object of my invention is the provision of an improved food mixer of the character identified.

Another object is the provision of an improved food mixer wherein pulpous fruits and vegetables may be quickly reduced to pulp form and dispersed in an aqueous medium.

My invention also relates to certain specific objects and features as will be particularly pointed out hereinafter in connection with the detailed description of the preferred embodiment shown in the drawings, wherein Fig. 1 is a vertical sectional view showing a food mixed or hydrator constructed in accordance with my invention;

Fig. 2 is a fragmentary, enlarged sectional view showing the switch detail;

Fig. 3 is a plan section taken on the line 3—3 of Fig. 1;

Fig. 4 is a sectional view taken on the line 4—4 of Fig. 1, looking in the direction of the arrows, the section being on the same scale as Fig. 1;

Fig. 5 is an enlarged fragmentary sectional view taken on the line 5—5 of Fig. 4, looking in the direction of the arrows, a nut being removed to show the end of the impeller shaft and the entire impeller in full lines;

Figure 6:
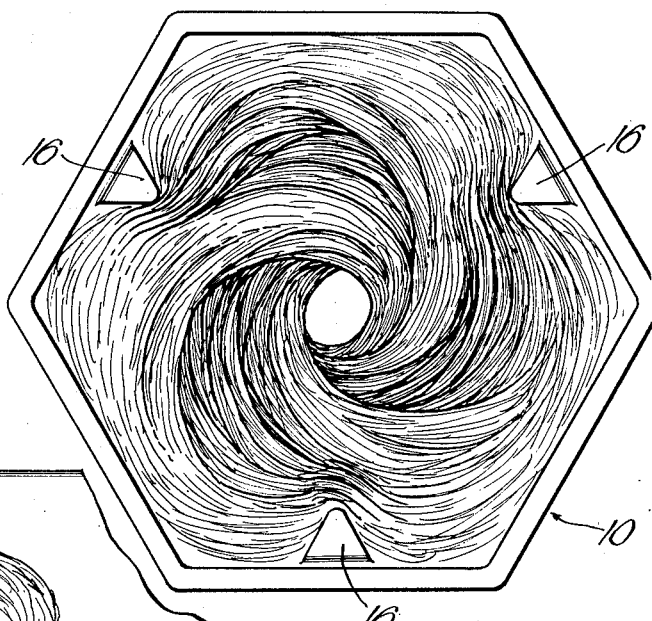
Fig. 6 is a plan view indicating the path which aqueous material takes when subjected to the action of the impeller within the mixing bowl.

Before proceeding to a detailed description of my invention, I wish to point out that the mixer shown in the accompanying drawings may be utilized not only to pulp and hydrate vegetable and fruit materials but also to mix aqueous materials, such as combinations of milk, dry milk powder, ice cream flavoring and the like, or other drink mixtures which normally require a mixing operation. In general, however, for the mixing of most strictly liquid materials, the device of my invention offers insufficient advantage over common mixing devices to warrant its use exclusively or principally for such purpose. Nevertheless, it should be kept in mind that when I refer to food mixers or mixers for food materials, devices for hydrating or pulping fruits and vegetables, these expressions are employed in a descriptive sense and are in no way intended as limitations of the scope of the invention.

The principal parts of the device, as illustrated in the accompanying drawings, are the mixing bowl indicated generally by the reference character 10 and the driving mechanism, forming at the same time a base and support for the bowl, the driving mechanism being indicated generally by the reference character 11. As a cursory examination of Fig. 1 will show, the bowl includes as an integral part thereof an impeller mechanism for producing the necessary pulping or hydrating operations, this impeller being driven by an electric motor forming a part of the driving mechanism 11. The impeller is driven at a relatively high rate of speed to secure the necessary functioning for which it has been designed. While the driving mechanism has certain features which are particularly adapted for use in conjoint action with the mixing bowl assembly 10, it may take various forms. For convenience, I shall refer first to the mixing bowl assembly, then to the driving mechanism, including the switch features, and finally to the functioning of the mechanism as a whole.

The mixing bowl assembly comprises a bowl generally of greater depth than diameter and tapering to a frusto conical lower portion 12 adjacent a bottom wall 13. Above the frusto conical section 12, starting at the point 14 indicated in Fig. 1, the mixing bowl comprises a plural preferably flat sided structure, such, for example, as a hexagonal structure, as indicated generally in Figs. 4 and 6. Looking at Fig. 4, it will be seen that this upper portion comprises a plurality of sides and on alternate sides are provided baffles 16 substantially midway of their side edges. A hexagonal cross section is preferred, although the number of sides may vary. Moreover, the position, shape and number of baffles 16 may be modified, although, as will be pointed out, the particular character and shape of the baffles have certain advantages if the optimum results are to be obtained.

As noted, a preferred construction of the mixing bowl is to have the irregularly constructed portion above the circular but generally frusto conical lower section in the form of a hexagon, the sides of which diverge toward the top. With this form, particularly desirable results are obtained if baffles are provided on alternate sides of the hexagon, and the results are still further augmented if the baffles are graduated from the lowermost end where they merge into the side walls to the uppermost end where they have substantially their maximum dimension. This arrangement of the baffles not only is important in connection with the preferred functioning of the food mixer, but it has the added advantage that the mixing bowl itself may be cast from suitable material, such as a stainless steel alloy, and there will be no problem in satisfactorily removing a core from the inside thereof.

The bowl is removable from its support on the driving mechanism assembly, being supported thereon in such a manner as to form a connection with the drive shaft of an electric motor. This will be brought out more clearly hereinafter. However, as shown particularly in Fig. 5, a shaft 17, journaled in a bearing member 20 within a support member 18, carries a non-circular socket 19 for the reception of a non-circular drive shaft 21 (Fig. 1). The support member 18 has a portion extending through a central opening in the bottom 13 of the bowl, and is threaded to receive a fastening nut 22. A washer 23 is disposed between an annular shoulder on the support member 18 and the bottom 13 of the bowl, and washer or gasket members 24 (which may be of rubber and metal, respectively) are disposed between the nut 22 on the lower part of the bottom 13 of the bowl. By tightening the nut 22 in position, it is clear that an entirely leak-proof connection is made through the bottom of the bowl. Secured to the top of shaft 17 is a nut 26, this nut clamping in position and against a shoulder provided on the shaft 17, an impeller 27, the functions and features of which will be explained later. The top of the shaft has two flat sides to accommodate a flat sided opening in the impeller (see Fig. 4) to key the impeller to the shaft. Washers are provided above and below the impeller, and a split spring washer 25 is disposed between the lower end of bearing 20 and a shoulder on the shaft 17 formed by the socket portion of the shaft. The split spring washer 25 functions to maintain a seal between the top of the bearing 20 and the contiguous assembly.

It will be noted that the support member 18 is so formed as to provide a generally conical shape above which the plural bladed impeller is mounted. This impeller is a single-piece device shaped as illustrated in Figs. 1, 4, 5 and 7 so that the orbit of its rotation determined in both the transverse and vertical direction substantially coincides with the entire space bounded within the frusto conical lower portion of the bowl. The blades are provided in pairs, each side having a blade projecting upwardly and an oppositely disposed blade projecting downwardly. The leading edges of the blades have knife-like edges to facilitate cutting and shredding of food material. The lower blades, as particularly noted in Fig. 5, extend substantially to the bottom of the mixing bowl and substantially to the outside edge thereof at the smallest diameter. The upper blades substantially coincide in their top position with a plane extending through the point 14 previously noted. The upper pair of blades is so pitched as to tend to carry material within the bowl downwardly into contact with the lower blades, while the lower pair of blades is so positioned and pitched as to move food upwardly by forcing it into contact with member 18 and the bottom 13, so that it is deflected upwardly along the side of the bowl. Liquid material will then move upwardly, but solid material, before it is broken up, is not so diverted upwardly. This very unusual mixing action will be described later.

The driving mechanism comprises an outer housing 28, open at the bottom and adapted to rest upon a plurality of feet 29 carried on the outside lower periphery thereof. A web member 31 is secured to the lower portion of the bell-shaped member 28, and carries a generally cylindrical housing member 32. This housing member encircles an electric motor and a motor drive shaft 33. At the top of the shaft 33 is a special coupling pinned, in the manner shown, to the drive shaft 33, and this coupling carries the drive shaft extension 21. A skirt 40 closes the opening through which the drive shaft passes, whereby to prevent extraneous material from fouling the motor.

It will be noted that the entire motor assembly is mounted on the housing 28 but within the housing member 32. At the lowermost portion of the housing member 32, I provide a screen 35. A fan 34 is mounted at the lowermost end of the shaft 33 and serves to withdraw air through the screen 35, across the motor, downwardly on the outside of the cylindrical member 32, and out at the lowermost edge of the bell-shaped housing member 28.

The motor within the cylindrical member 32 is, of course, driven by suitable electric power, depending upon the design, such as commercial current. I provide improved switch mechanism for controlling the motor, and also improved mechanism for quickly and accurately securing the bowl 10 to the mixing mechanism.

At a plurality of positions on the lowermost outer edge of the mixing bowl 12, I provide cut-away portions 36 (Fig. 5), and these cut-away portions receive upright projections 37 carried on the outer housing 28. Preferably, as illustrated in Fig. 3, the members 37 are covered with a vibration damping material, such as rubber. The use of three such supports, as shown in Fig. 3, absolutely precludes any possibility of accidental separation of the bowl from the driving mechanism, assures its positioning accurately upon the driving mechanism, and decreases any vibrations which might otherwise be imparted to the bowl itself from and through the drive shaft 33.

Within the cylindrical member 32, I provide a switch housing 38, the lowermost portion of which carries a pair of spring contact members 39. Looking at Fig. 2, the spring contact members carry contact points 41 which are brought into engagement by operating a switch arm 42, against the action of spring 43, to the position shown in Fig. 2. The switch arm 42, as shown, is pivoted intermediate its ends and the innermost end near the point of engagement of spring 43 engages a projection 44 on one of the spring contact members 39 to close the contact points 41. It will be noted that the spring contact members 39 extend upwardly and project through an aperture in one of the upright projections 37 which carry the mixing bowl 10 in a manner already described. The spring contact members 39 are so shaped that, when the mixing bowl 10 is removed from its support, a plunger 46, extending through the aperture referred to and carried on one of the spring contact members 39, will extend into the aperture and, even though the switch arm 42 be in the position shown in Fig. 2, the contact points 41 will still not be in engagement. When the mixing bowl 10 is put in position, however, the spring contact members 39, through the force exerted on the plunger 46, are brought to the position shown in Figs. 1 and 2, and, in this position, the operation of the arm 42 serves to close the contacts and start the driving motor. In Fig. 1, I illustrate two short conductors leading from the contact points 41. These conductors normally are part of a circuit supplying voltage to the motor, but the complete electrical circuit need not be shown to enable those skilled in the art to understand the functioning of the switch. Because of the arrangement described, it is obvious that the switch cannot be operated to energize the motor, except when the mixing bowl is in position. Even though the switch arm 42 may be moved to the lower position shown in Fig. 1, the effect of allowing the spring contact members 39 to move to the right is such as to reduce the friction at the end of the switch arm 42 and permit the spring 43 to move the switch arm downwardly. Obviously, also, the spring contact members 39 and the entire assembly may be so arranged that mere removal of the bowl 10 will separate the spring contact members, and the switch arm 42 will then be returned to neutral position because of taking the projection 44 out of engagement with the end of the switch arm.

The mixing bowl assembly of my invention may be constructed of various types of materials and may be modified in many specific ways while still obtaining the unusually desirable results from the combination features described. A suitable material for the bowl is stainless steel, glass or the like, and the bowl may be cast as a unit from such materials. The washer 23 preferably is formed of solid tin, such material being sufficiently soft but still being fully resistant to corrosion from such substances as fruit acids and the like. The remaining parts within the bowl of the mixing member are preferably formed of stainless steel, such, for example, as the impeller; or, as an alternative, materials may be selected which have proper mechanical and metallurgical properties, and they may be treated to form a coating of chromium or the like upon them.

By the combination of features disclosed, an unusual pulping and mixing action takes place so that very rapidly whole individual vegetables, such as carrots, potatoes, and the like, introduced into the bowl, will be reduced to pulp form, particularly when a suitable proportion of water is added, and all of the material so introduced will be thoroughly mixed.

Figure 7:
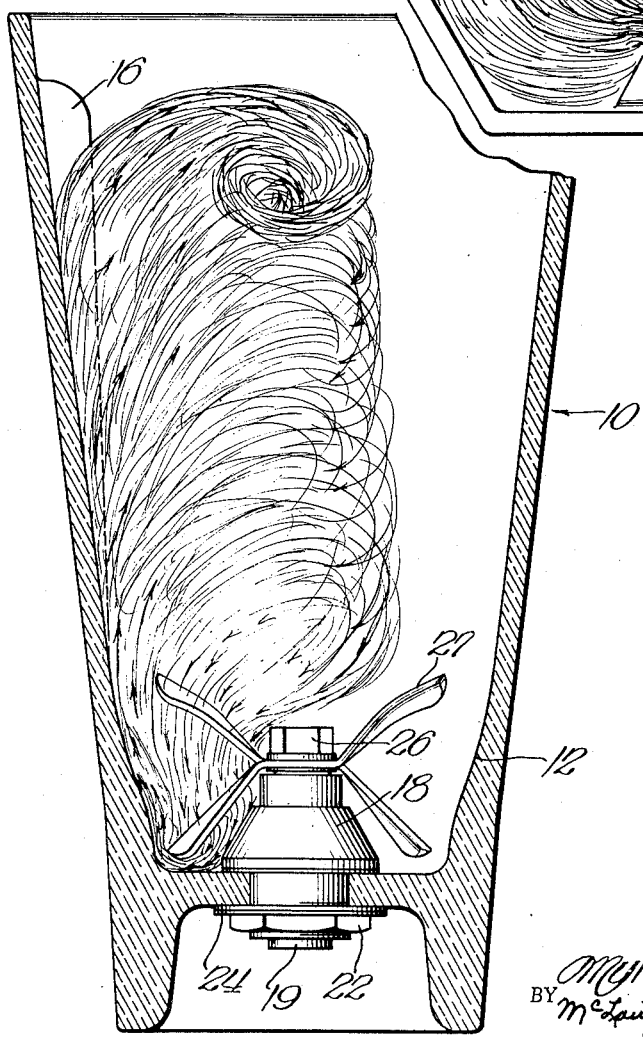
Fig. 7 is a vertical central section with the impeller in elevation, also illustrating the path which the material takes during a mixing operation.

Figs. 6 and 7 illustrate, as adequately as it is possible to illustrate on paper, the unusual path which material within the bowl follows during operation. It has been explained that the downwardly and outwardly projecting pair of blades on the impeller are so pitched that when the impeller moves in the direction indicated by the arrow on the drawings, the tendency will be to lift substantially liquid material upwardly along the side walls, while the upwardly and outwardly extending blades drive material downwardly into contact with the lower blades. The forward edges of all of the blades are sharpened so as to have substantially knife-like cutting edges. This causes a thorough disintegration and pulping of large particles of material as such particles remain for a substantial period of time in the region in which the blades are operated. The positioning of the blades is important in securing this result.

The rotating action of the blades has a tendency to impart a strong centrifugal action to material in the bowl. That this action is very pronounced and definite is obvious from the fact that in a preferred design, the speed of the impeller blades is on the order of twenty two thousand revolutions per minute, although, of course, the speed may vary. Preferably a series wound motor is employed in which case the speed will vary with the load, being less during the period when solid material is being shredded. In a perfectly circular bowl, sloping outwardly as the bowl of my invention does, the strong centrifugal action would have a tendency to move the contents of the bowl upwardly and over the top edge. As already explained, however, immediately above the portion of the bowl in which the impeller operates, the inside shape of the bowl is irregular, preferably, as explained, in the form of a hexagon, and alternate sides of the hexagon are provided with baffles, the baffles extending further away from the surface as they extend upwardly. As a consequence, the centrifugal and rotary movement of the contents of the bowl continues with more and more interruption as the contents get higher and higher in the bowl, until, near the top of the bowl (although this will depend to some extent on the amount of material in the bowl and the speed of the motor), this rotating action of the material in the bowl is substantially fully arrested or diverted toward the inside.

There are, therefore, several distinct types of movement, changing as we go from the bottom of the bowl to the top. There is first a rotating movement and a climbing along the sides of the bowl, which is substantially the only type of movement in the lowermost portion. Then there is a movement toward the center of the bowl as the material is diverted by the baffles, this movement being in a horizontal plane, and, finally, a similar movement of material from the side of the bowl toward the center thereof in a generally vertical plane. The result is a path substantially as illustrated by the shaded lines in Figs. 6 and 7 in which the material is mixed very rapidly, moves downwardly at the center into contact with the impeller, up at the sides with a regular form of eddy action throughout the entire inside of the bowl resulting from components of the various movements pointed out. If raw vegetables, such as carrots, potatoes, and the like, cooked beef, fruits such as bananas, or any materials of this type be introduced with an amount of water sufficient to form a sufficiently fluid mixture, and the impeller operated, only a very short time is required to bring about thorough disintegration of the food material and a thorough mixing. While the pieces of food material are relatively large, they remain at or near the paths of the two sets of blades, but as smaller pieces are formed, they may move through the path described. If any particles of the food material are not sufficiently disintegrated in their first contact with the impeller blades, they will quickly be brought back into contact with them again. Since the orbit of the blades is within an area almost coextensive with the area of the rounded bottom portion of the bowl, there is no opportunity for even small particles to become lodged in such a way that they will miss the shredding action of the blades.

In connection with the impeller, it should be noted that the top and bottom blades vertically are substantially in the same plane. This permits food material to readily fall to the portion of the bowl below the path defined by the upper blades. In connection with the shape of the bowl, it will be noted that there is a slightly concave surface immediately below the point 14. This shape, combined with the other features, seems to add greatly to the efficacy of the mixing. While this and other structural features of the invention are important in producing to a maximum the functions sought after, modifications in structure may be utilized, without departing from the scope of the invention as defined in the claims.

What I claim as new and desire to protect by Letters Patent of the United States is:

1. In a food mixer of the character described, the combination of a bowl and impeller so shaped and so related to each other that materials introduced to the bowl while the impeller is rotated at high speed are quickly comminuted and mixed, said bowl having a lower portion of relatively narrow circular cross section with upwardly diverging sides, and an upper continuing section with upwardly diverging walls shaped to split into a plurality of vortices liquid-like material which has had a circular motion imparted to it while in the bottom portion of the bowl, said impeller having a pair of blades projecting outwardly and upwardly at an angle of about 45 degrees to the horizontal, and a pair of blades projecting outwardly and downwardly at about 45 degrees to the horizontal, both sets of blades being pitched in a direction to force material downwardly during rotation, the area of rotation of such blades substantially entirely filling said lower portion.

2. In a food mixer of the character described, the combination of a bowl and an impeller so shaped and so related to each other that materials introduced to the bowl while the impeller is rotated at high speed are quickly comminuted and mixed, said bowl having a lower portion of circular cross section diverging upwardly, approximately the lower half of said lower portion being slightly convexed, and an upper diverging portion provided with means for breaking up into a plurality of vortices material which has been given a rotary movement while in the bottom portion, said impeller comprising a frusto conical support and four blades, two of said blades projecting outwardly and upwardly at an angle of about 45 degrees to horizontal, and two of said blades projecting outwardly and downwardly approximately 45 degrees to the horizontal, said blades having sharpened leading edges and being pitched in a direction to force materials downwardly during rotation, the area of rotation of such blades substantially entirely filling said lower portion.

3. In a food mixer of the character described, a mixing bowl, open at the top for admission of food or the like, said bowl having a bottom and side wall, said side wall having a regular circular lower portion, a drive shaft extending through the bottom so as to seal the same, and an impeller carried by the shaft and disposed in said lower portion, said impeller having a plurality of blades with relatively sharp leading edges, some of said blades slanting upwardly and some slanting downwardly to points near the upper part of said lower portion and near the bottom respectively, said blades terminating just short of the side wall, the parts being so constructed and arranged that food material such as vegetables and the like introduced into the bowl will be immediately engaged by the impeller blades and maintained in the zone of action of the blades until substantially entirely broken up and comminuted.

4. A food mixed as defined in claim 3, wherein said impeller comprises a single piece member with four blades, two projecting upwardly and outwardly and two projecting downwardly and outwardly, both sets of blades being pitched so as to force material downwardly during rotation, whereby solid food material will be retained near the bottom and within the area defined by the rotation of the blades until substantially reduced to pulp.

5. In a food mixer of the character described, a bowl having a lower portion of circular cross section, and an upper portion of non-circular cross section, said upper portion having a plurality of vertically extending baffles, and an impeller having blades with sharpened leading edges disposed at the lower circular portion of the bowl, its orbit of rotation being substantially such as to fill said portion, whereby substantially all material within the lower portion of the bowl is engaged by the impeller, the inner walls of said bowl diverging from the bottom substantially to the top thereof.

6. In a food mixer, a bowl having a bottom, and sides sloping upwardly and outwardly, a portion of the sides near the bottom being circular in cross section, the remaining portions being hexagonal in cross section, vertically disposed baffles on the inside surface of the bowl, an impeller disposed near the bottom of the bowl, said impeller having a plurality of blades extending laterally almost to the inner contiguous surface of the bowl and in a vertical direction covering a major portion of the area occupied by the circular portion of the bowl, and means for driving said impeller at a high rate of speed, said impeller blades having sharpened leading edges, and the blades and bowl portion adjacent the same being so constructed and arranged that food material such as vegetables and the like introduced into the bowl will, as it falls to the bottom thereof, be engaged by said blades and maintained in contact therewith until the sharpened leading edges substantially entirely comminute the said food material.

7. In a food mixer of the character and for the purpose described, a bowl of circular cross section with bottom and side walls, and an impeller disposed near the bottom of the bowl and mounted axially thereof, said impeller comprising a single-piece member having a flat center portion for attachment to a shaft, and four blades comprising continuations of said flat portion, said blades comprising two pairs of blades projecting together from the center portion, each pair projecting in the opposite direction from the other pair, and each pair of blades consisting of one blade projecting upwardly and outwardly and one blade projecting downwardly and outwardly, all said blades being pitched to force material downwardly, the blades having sharpened leading edges and extending substantially to the side wall and to a point near the bottom of the bowl.

8. In a food mixer of the character described, a mixing bowl having bottom and side walls, a lower portion of the side wall being of relatively narrow cross section but upwardly diverging, said lower portion being circular and the side wall portion above the same being non-circular, a generally frusto conical member supported on the bottom, and having an impeller drive shaft extending vertically therethrough, and an impeller secured to said shaft having four blades pitched to force downwardly material with which they come in contact, leading edges of said blades being relatively sharp, two of said blades being generally oppositely disposed to each other and extending downwardly and outwardly to a point almost at that portion of the bowl where the bottom and side walls join, and two of said blades being generally oppositely disposed to each other and extending upwardly and outwardly to points further removed along a radius line from the axis of rotation than the first-mentioned blades, whereby to extend close to said side wall, the parts being so constructed and arranged that solid food material, including vegetables and the like, will be quickly comminuted when dropped into said bowl in contact with the impeller blades.

9. In a food mixer of the character described, a mixing bowl, open at the top for admission of food or the like, said bowl having a bottom and side walls, a substantially circular portion near the bottom, a drive shaft extending vertically through said bottom, and an impeller carried by said shaft and disposed in the said circular portion of the bowl, said impeller having sharpened leading edges and said impeller being of a size and shape so as substantially to include the area of the said circular portion within its orbit of rotation, the parts being so constructed and arranged that solid food material, such as vegetables and the like, introduced into the bowl will be quickly comminuted in contact with the said impeller blades.

10. In a food mixer: a bowl having a bottom and sides sloping upwardly and outwardly, a portion of the sides near the bottom being circular in cross section, the remaining portions of the sides being polygonal in cross section; vertically disposed baffles on the inside surface of the bowl; an impeller disposed near the bottom of the bowl, said impeller having a plurality of blades extending laterally almost to the inner contiguous surface of the bowl and in a vertical direction covering a major portion of the area occupied by the circular portion of the bowl; and means for driving said impeller at a high rate of speed, said impeller blades having sharpened leading edges and the blades and bowl portion adjacent the same being so constructed and arranged that food material such as vegetables and the like introduced into the bowl will, as it falls to the bottom thereof, be engaged by said blades and maintained in contact therewith until the sharpened leading edges substantially entirely comminute the said food material.

11. In a food mixer of the character described: a mixing bowl open at the top and having a lower portion circular in cross section and an upper portion non-circular in cross section; an impeller rotatably mounted on the bottom wall of the mixing bowl and having blades with sharpened leading edges, the length of the blades being such that the ends of its blades come close to the inner wall of the lower circular portion of the bowl so that the orbit of rotation of the impeller substantially fills the lower portion of the bowl to insure contact of substantially all material with the impeller, and surfaces on the impeller blades so pitched with relation to the direction of rotation of the impeller as to force material downwardly.

MYRON J. LANDGRAF.